No. 654,225. Patented July 24, 1900.
A. D. CARNAGY.
METHOD OF MAKING ENDLESS WIRE ROPES OR CABLES.
(Application filed Feb. 20, 1900.)
(No Model.)
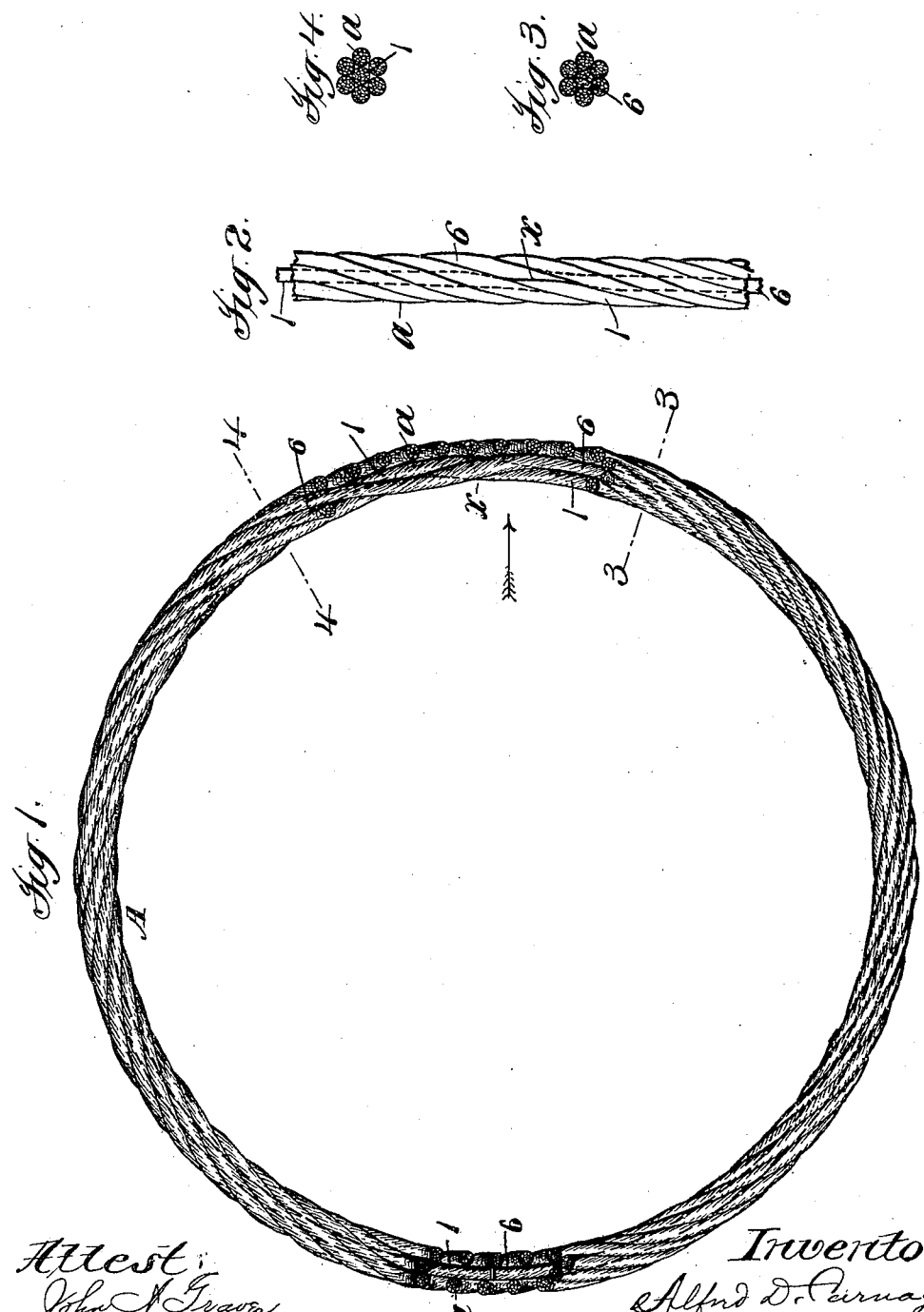

UNITED STATES PATENT OFFICE.

ALFRED D. CARNAGY, OF TRENTON, NEW JERSEY, ASSIGNOR TO THE JOHN A. ROEBLING'S SONS COMPANY, OF SAME PLACE.

METHOD OF MAKING ENDLESS WIRE ROPES OR CABLES.

SPECIFICATION forming part of Letters Patent No. 654,225, dated July 24, 1900.

Application filed February 20, 1900. Serial No. 5,895. (No model.)

*To all whom it may concern:*

Be it known that I, ALFRED D. CARNAGY, a citizen of the United States, residing at Trenton, county of Mercer, and State of New Jersey, have invented certain new and useful Improvements in Methods of Making Endless Wire Ropes or Cables, fully described and represented in the following specification and the accompanying drawings, forming a part of the same.

This invention relates to an improved method of producing endless wire rope or cable, the especial object of the invention being the production of comparatively-small rings of wire rope or cable, although the invention may be applied also in connection with the production of endless wire ropes or cables of any dimensions.

The number of splices required and the length of material necessary for efficient splicing of wire rope or cable practically prevent the production of endless wire rope or cable by splicing the ends of the strands together, especially where much strength is required, unless the length of the rope or cable be sufficient to separate considerably the splices of the different strands, and even in making endless rope or cable of such length as to permit this the splicing of the different strands so as to secure a smooth and strong splice is a slow and expensive operation. The endless wire rope or cable produced by the method of the present invention is formed without splices and of a single strand, the successive windings of which strand form the outer layers of the rope or cable and the ends of which strand form the core of the rope or cable. A ring of this construction may be made of large rope or cable, so as to secure great strength, while from the fact that no splices are used, so that the length of material necessary for splicing is not required, such a ring may be made of practically as small a size as desired for any use to which such metal rings or endless wire ropes or cables are applicable.

The invention consists in an improved method of making wire rings and other endless wire ropes or cables, in accordance with which method I make a form of the ring to be produced having strands of the same size, number, and arrangement as the ring, and then remove successively the outer strands of this form and substitute for each of said strands a winding of the single strand from which the ring is to be made, and finally substitute for the core-strand of the form the opposite ends of the ring-strand.

For a full understanding of the invention a detailed description of a construction of the preferred form made in accordance with my invention will now be given in connection with the accompanying drawings, forming a part of this specification, and the features forming the invention will then be specifically pointed out in the claim.

In the drawings, Figure 1 is a plan view of a ring with parts broken away to show the construction. Fig. 2 is a detail view looking in the direction of the arrow in Fig. 1. Figs. 3 and 4 are cross-sections on respectively the lines 3 and 4 of Fig. 1.

The ring shown is a wire-rope ring with the usual central core and six outer strands; but it will be understood that the number of strands outside the core may be varied. This ring A is made of a single strand $a$, wound spirally about the core, as usual with separate strands in forming wire rope or cable, successive windings of the strand $a$ forming the outer layer of the rope ring A and the core of the rope being formed by the ends of the strand $a$, these ends 1 6 passing from the outer layer of the rope into the middle of the rope at the same point on one side of the ring, as shown at $x$ in Figs. 1 and 2, and each preferably extending half-way around the ring, so that they meet on the opposite side of the ring, as shown at the top of Fig. 1. It will be understood, however, that those portions of the opposite ends of the strand that form the core may be of different lengths and meet at any other desired point in the ring; but greater strength is secured with the ends of substantially-equal length, as in the construction shown. The strand $a$ is shown as formed of a large number of strands of comparatively-small wire, so as to make a flexible wire strand, as usual in wire rope and cable construction; but the construction of the single strand from which the ring is made is not essential to the invention. The ring A may be of any suitable size and the size of the strand *a* varied as desired, in accordance with the use for which the ring is designed.

A ring or endless wire rope or cable of the construction shown and above described forms the subject-matter of another application, Serial No. 696,151, filed November 11, 1898, irrespective of the method by which it is made; but such rings are preferably made by the following method, which forms the invention of the present application: I first make a form by bending a piece of rope or cable, preferably of wire and preferably for convenience and cheapness having a hemp center or core, into a ring of the same size as the ring to be made, the ends of the form rope or cable being abutted but not spliced together. The rope or cable from which this form is made has strands of the same number and size and arranged in the same manner as the strands of the ring to be formed. I then take a single strand, as strand *a* of the ring shown in the drawings, and, starting at the point where the ends of the form-ring are abutted, which is the point at which the ends of the strand are inserted to form the core, (point *x* in the drawings,) I remove one of the strands of the form-ring and substitute for it a winding of the single strand *a*, from which the ring is to be made. In applying the single strand for this first winding the end of the strand is left projecting to such an extent as is desired for insertion to form the core, this first winding being strand 1 of the ring shown in the drawings and the end being shown as left of sufficient length to extend half-way around the ring and form one-half the core. When this first winding 1 of the strand *a* has been laid into the form by substitution for a strand of the form-ring, the next strand of the form-ring is taken out and a second winding of the strand *a* substituted therefor. This operation of substituting a winding of the strand *a* for a strand of the form-ring is continued until all the outer strands of the form-ring have been replaced by windings of the single strand *a*, the last winding being that marked 6 in the ring shown in the drawings. When this last winding 6 of the strand *a* is laid in, the end of the strand is left projecting such a distance as desired for the formation of the core, being one-half the circumference of the ring shown, and the ring A is then complete, except that the core is formed by a strand of the original form-ring for which the ends of the single strand *a* are now to be substituted. This substitution is made by drawing out the core-strand of the form-ring and substituting therefor the two ends 1 6 of the single strand *a*, which ends are inserted into the center of the wire rope or cable formed by the six windings of the strand *a* and preferably extend so as to abut and form a complete core within the ring.

It will be understood that my improved method may be used in making rings or endless wire ropes or cables of any desired size and that the invention is not to be limited in respect to the size or length of the strand used, although the invention is of especial value and especially intended for application in connection with the production of comparatively-small rings or other endless ropes or cables.

The invention has been found very efficient in connection with rings such as shown of a diameter of about fifteen inches, with the strand *a* of one-fourth-inch diameter.

What I claim is—

The method of making endless wire rope or cable which consists in making a form of the article desired having strands of the same size and number as those of the rope or cable to be formed and substituting for each of the outer form-strands in succession a winding of the strand from which the wire rope or cable is to be made and finally substituting for the core-strand of the form the opposite ends of the strand which has been substituted for the outer form-strands, substantially as described.

In testimony whereof I have hereunto set my hand in the presence of two subscribing witnesses.

ALFRED D. CARNAGY.

Witnesses:
CHARLES C. COOLEY,
DUNCAN M. ANDERSON.